United States Patent [19]

Denizou et al.

[11] Patent Number: 4,765,949

[45] Date of Patent: Aug. 23, 1988

[54] SPACING GRID FOR NUCLEAR FUEL ASSEMBLY

[75] Inventors: Jean-Pierre Denizou, Craponne; Bruno Mouesca, Lyons, both of France

[73] Assignees: Framatome; Compagnie Generale des Matières Nucléaires, both of Courbevoie, France

[21] Appl. No.: 32,689

[22] Filed: Apr. 1, 1987

[30] Foreign Application Priority Data

Apr. 2, 1986 [FR] France .................................. 86 04708

[51] Int. Cl.$^4$ .............................................. G21C 3/34
[52] U.S. Cl. .................................... 376/443; 376/439
[58] Field of Search ................. 376/443, 438, 439, 442

[56] References Cited

U.S. PATENT DOCUMENTS 4,388,269 6/1983 Larson ................................. 376/442

4,666,663 5/1987 Steinke ................................. 376/442

FOREIGN PATENT DOCUMENTS 61-44271 10/1986 Japan ................................... 376/442

Primary Examiner—Donald P. Walsh
Attorney, Agent, or Firm—Pollock, Vande Sande & Priddy

[57] ABSTRACT

A spacing grid for a nuclear fuel assembly, particularly a water cooled assembly, includes two spaced sets of plates. Each set is formed of plates parallel to each other and fixed at their ends to a polygonal belt in the form of a strip having fins along one longitudinal edge at least. Each corner of the belt is free of openings. Two at least of the corners are rounded and located inside of imaginary extensions of the flat lateral faces of the belt. They are connected to the edges of the lateral faces by gussets sloping radially inwardly.

9 Claims, 5 Drawing Sheets

SPACING GRID FOR NUCLEAR FUEL ASSEMBLY

BACKGROUND OF THE INVENTION

1. Technical Field

The invention relates to nuclear fuel assemblies and more particularly to grids for maintaining the fuel rods of a nuclear fuel assembly at a proper spacing, said grids including at least two spaced sets of plates, each set being formed of mutually parallel plates fixed at their ends to a polygonal belt in the form of a closed strip having fins along one edge at least.

Most light water cooled reactors now in operation use fuel assemblies of square cross-section, including a skeleton formed by two end pieces joined together by guide tubes and a plurality of grids welded to some at least of the guide tubes. The fuel rods are distributed in a square array and are substituted with guide tubes at certain of the nodal points of the array.

During loading into the core, or during removal of a fuel assembly, the latter is moved vertically with respect to the other assemblies. During this relative movement, it happens that a grid of the assembly being moved hooks onto a grid of an adjacent assembly, and hang up occurs. Such jamming generally occurs at a corner of a grid.

By way of example, FIG. 1 is a view from above showing how a grid 10 of an assembly being lowered into a reactor core may hook onto a grid 10a of an assembly already in the core. The guide fins 12 conventionally placed at the upper part of some at least of the grids prevent the grid of the assembly being lowered from sliding laterally if there is an overlap. Hang up may occur between two diagonally positioned assemblies, or between the flat sides of two grids of mutually adjacent assemblies, whatever the external shape of the assembly, between assemblies having a hexagonal cross-section as well as between those having a square cross-section.

2. Prior Art

Numerous attempts have been made to reduce the risk of hang-up which may irreparably damage the grids or even tear away sections thereof which are then driven into the primary coolant circuit. Arrangements for that purpose are described for instance in European Pat. No. 052,924 (Larson) and 141,208 (Steinke).

Arrangements have more particularly been proposed applicable to grids whose belt is formed by a strip having wide cuts defining bent tongues resiliently bearing on the rods. An approach described in French Pat. No. 2,337,918 consists in providing such grids with ribs projecting from the belt. This solution does not reduce the risk of hang-up at the corners. It has also been proposed, in grids whose belt has a height less than that of the plates, to bevel the end portions of the plates and to form a bevel on the corners of the belt (French Pat. No. 2,163,482). This construction has drawbacks and limitations pointed out in European Pat. No. 052,924 which suggest to shape the grid corners so as to define, at the top and bottom of each corner, an oblique gusset extending up to bends or folds formed parallel to the larger faces of the grids and which define tongues bearing on the rods and up to the ends of an opening formed in the corner of the belt and elongated in the direction of the rods.

SUMMARY OF THE INVENTION

It is an object of the invention to provide an improved grid reducing the risk of hang up. For that purpose, in a grid of the above-defined type, each corner of the belt is devoid of opening, is truncated with respect to an imaginary extension of the flat lateral faces of the belt, and is joined to the edges of the belt by inwardly shaped gussets.

The truncation of each corner may be in the shape of a rounded bend of a strip section belonging to the belt. The strip section may be fixed to the rest of the belt by welding at a location within a lateral face thereof, whereas at the present time welding is rather along the apex of the corner.

In a particular embodiment, the gusset forms a hood in the form of an inclined plane or spherical skull cap. This hood may extend, in the direction of the rods, beyond the remainder of the belt, including the fins, and gradually narrow to envelop each corner fuel rod. Then, coolant passages will be provided so as to ensure cooling of the rods in the zones where normal coolant flow is prevented by the hood.

The elements bearing on the rods may be formed as bosses stamped in the belt strips, without cutting the strips, directed inwardly and distributed in two parallel rows situated one above the other, in the lengthwise direction of the rods. The belt may further include spacing bosses between adjacent assembly grids, formed by outward stamping of the flat faces of the belt, having a construction similar to that of the bosses bearing on the rods. Since there are no cuts or slits, the spacing bosses which participate in overcoming the risk of hang up by maintaining of the adjacent assembly grids at a distance during relative axial movement, cannot themselves cause hooking on.

The invention will be better understood from the following description of particular embodiments of the invention, given by way of examples.

DESCRIPTION OF PREFERRED EMBODIMENTS

Figure 1:
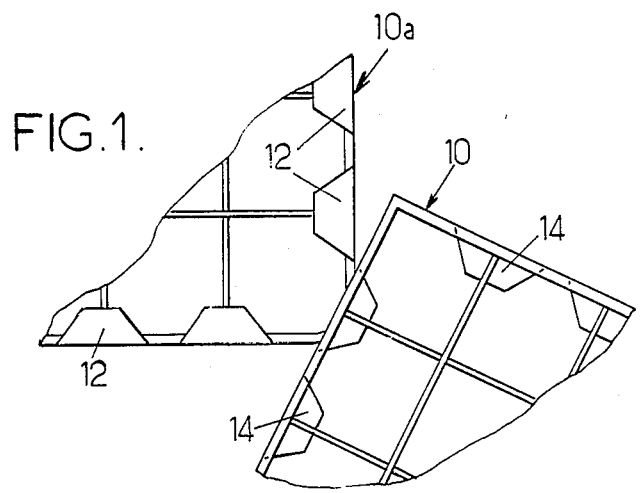
FIG. 1, already mentioned, is a top view of a relative arrangement of two assemblies likely to cause hang up during vertical movement of an assembly adjacent to an assembly already in place.

Referring again to FIG. 1, grid corners are prone to cause hang up. The provision of sloped fins 14 to bring the grids into a relative position promoting mutual sliding is a very insufficient palliative. The purpose of the different embodiments of the invention which will now be described is to provide surfaces or edges in the corners of the grid, favoring relative sliding of mutually adjacent grids and spacing apart from each other the zones of the grids which may be cause or hang up.

Figure 2:
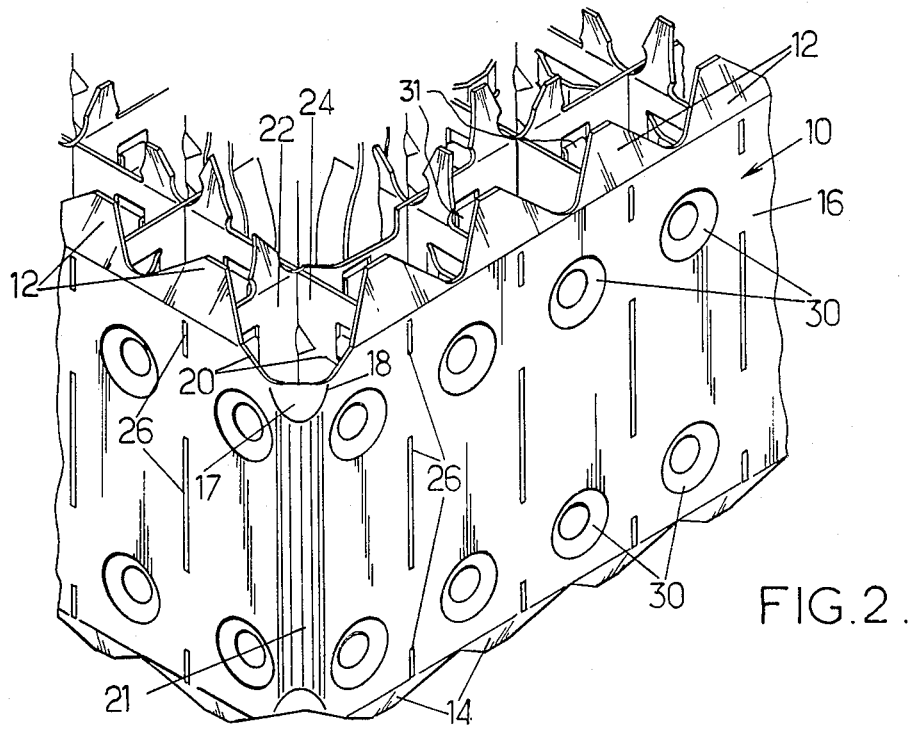
FIG. 2 is a partial perspective view showing a grid fraction in accordance with an embodiment of the invention.

In the embodiment shown in FIG. 2, the belt 16 of the grid has, at each corner, two stamped gussets. Each gusset is at an angle of about 45° with the axis of the grid (i.e. the direction of fuel rods received in the grid). The fold 18 which defines each gusset ends at the base of a tapering truncation 20 formed on the endmost parts of two adjoining lateral faces of belt 16. On each face, the truncation ends at the base of the first guide fin 12, provided along the corresponding edge of the face. The length of the sharp edges of the truncation 20 is thus minimized.

Furthermore, the two flat belt surfaces joined at the corner are connected by a bend 21 having a substantially quarter-round shape, which further reduces the risk of hang-up. The radius of the quarter-round is such that it leaves an annular gap providing a passage for the coolant between the belt and the fuel rod placed in the corner cell, defined by the belt and plates 22 and 24. The plates may be securely fixed to belt 16 in any appropriate and known manner, for example by endmost tenons of the plates projecting into slots 26 of the belt and welded thereto. The plates carry springs (not shown) which apply the fuel rods against bearing bosses in the form of dimples or nipples formed on the belt.

Figure 3A:
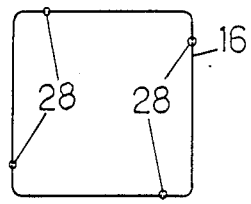
FIGS. 3A and 3B are diagrammatic views from above showing different possible locations of welds connecting strip sections to form a grid of the kind shown in FIG. 2.
Figure 3B:
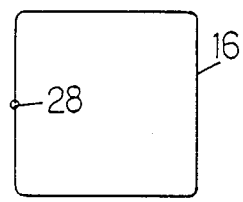
Figure 4A:
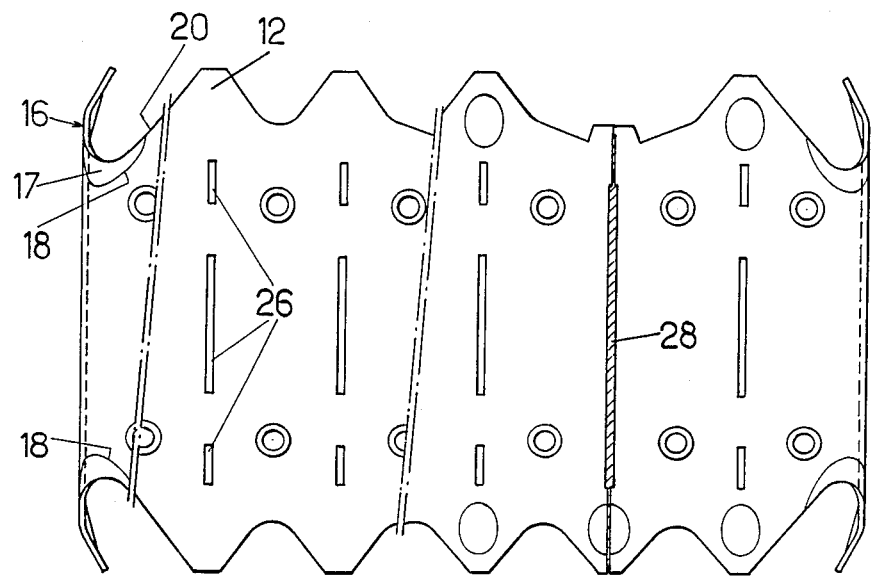
FIGS. 4A and 4B are detail views on an enlarged scale showing part of a belt welded in accordance with the arrangement shown in FIG. 3A, respectively in side and top view.
Figure 4B:
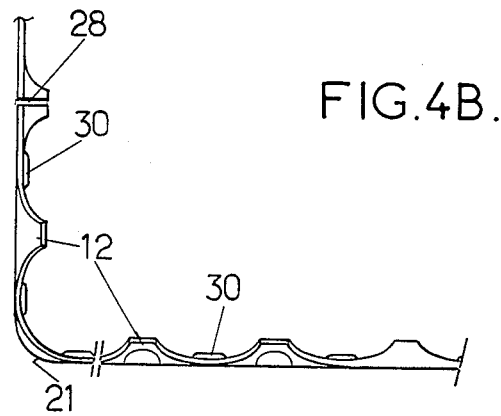

Most currently used belts are generally formed of four strip sections welded at the four corners of the belt; when the arrangement shown in FIG. 2 is used, it is quite preferable to form the quarter-round 22 by bending the running length of a strip section and to weld successive strips in the running part of one or more sides of the belt. FIGS. 3A and 3B show two possible locations of the welding beads 28. The position of the welds 28 is selected as a compromise between easiest stamping of the strip sections and easiest assembling of the belt. As shown in FIG. 3B, a single strip section is used and formed with four 90° bends. The ends of the section are welded together at 28 in the middle of one face. As shown in FIG. 3A, the four sections are formed by stamping and bending straight strips and then welding them in rectilinear portions. The arrangement of the welding beads 28 may then be as shown in FIG. 4A and 4B.

Numerous modifications of the arrangement shown in FIG. 2 are possible. Gusset 17 has not necessarily a flat shape. It may for instance be convex and approximate a spherical skull cap. When a weld at the corner of the belt is acceptable, the gusset may be formed by joining two bent zones each belonging to one of two strip sections intended to form two successive lateral faces of the belt.

When the corners of the belt are formed by bending a strip section, support means provided for contacting the rods are typically as bosses or nipples formed by deformating the belt without cutting it rather than as punctured portions of the strip. Such a construction enhances the mechanical strength of the external belt. As shown in FIG. 2, the bosses 30 are frusto-conical buttons or nipples and formed by inwardly deforming the metal sheet forming the strip section. The bosses are disposed in two parallel rows, in the zone of the strip located between the rows of slots 26 receiving the tenons which terminate the plates 22 and 24 and on both sides thereof. They constitute abutments for the fuel rods biased by resilient elements 31 carried by the plates or formed in the plates.

The purpose of the arrangement described up to now is essentially to promote mutual sliding of the grids when they come into contact without rendering manufacture of the grids more difficult. It is useful, especially when assemblies including arrangements of the kind described up to present are used at the same time as prior art assemblies, to provide mechanical means on the belt for maintaining adjacent grids spaced from each other before their corners come into contact. Examples of such arrangements will now be described for avoiding or at least limiting the risk of having two superimposed grids come into contact while they are in the relative position shown in FIG. 1.

Figure 5:
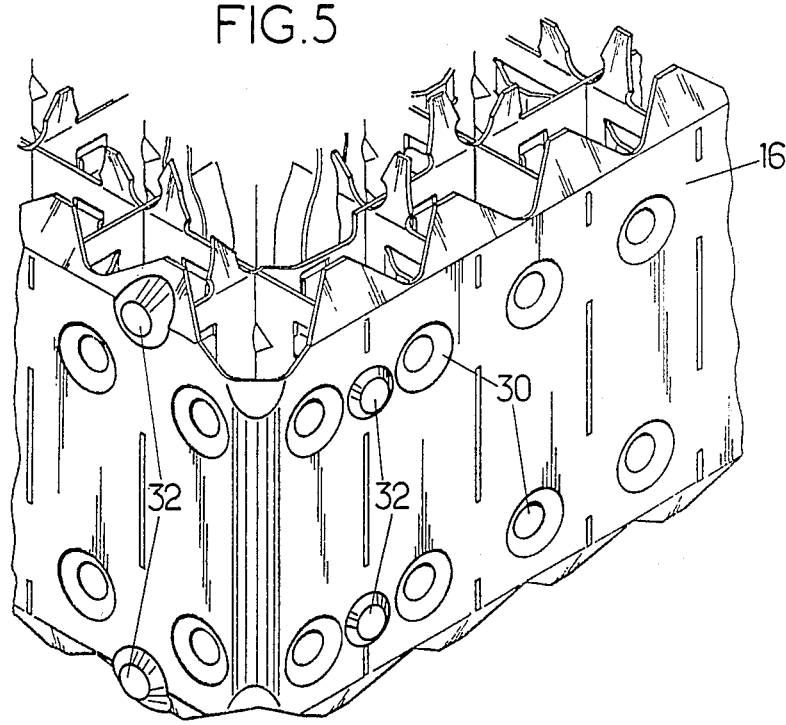
FIG. 5, similar to FIG. 2, shows a modified construction comprising spacing bosses, two different possible arrangements of the bosses being shown on the left hand part and on the right hand part of the Figure.
Figure 6:
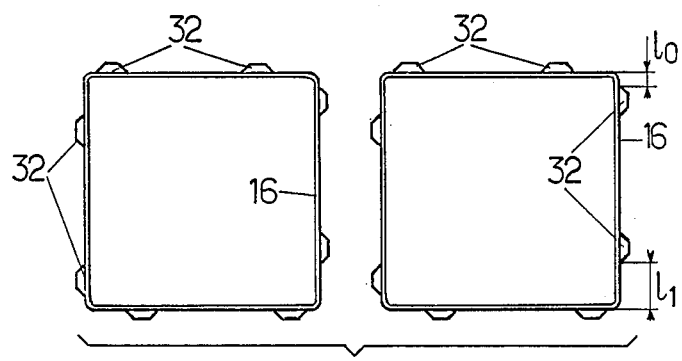
FIG. 6 is a top diagrammatic view showing a possible arrangement of spacing bosses on the grids of two adjacent elements.

Referring to the right hand part of FIG. 5 (where the parts corresponding to those of FIG. 2 are designated by the same reference numbers), each side of belt 16 has, in the vicinity of each corner, a longitudinal row of two outwardly projecting spacing bosses 32. Two axially aligned bosses may be disposed between the slots of the same plate (right hand part of FIG. 5). They may also be placed at the base of fins 12 (left hand part of FIG. 5). They may also be placed at the base of fins 12 (left hand part of FIG. 5). The spacing bosses may be formed during the manufacturing process in the same way as the bearing bosses 30, but outwardly. Their amount of projection may be of the same order of magnitude as that of bosses 30, i.e. from some tenths of a millimeter (typically 0.5 mm) to about 1.5 mm.

The bosses 32 have the additional advantage of limiting the bending of a fuel assembly which is provided therewith and ensuring better spacing of the assemblies in the core; no general description of the assembly will be given since it may be conventional.

When the grid is of a material, such as zirconium base alloys, likely to exhibit swelling under irradiation, the bosses 32 are preferably located so that the bosses of two mutually adjacent assemblies do not face each other. For that, the bosses 32 on a lateral face of the belt may be at different distances $L_0$ and $L_1$ from the corner. In addition, the bosses may be formed so as to crush under relatively small inwardly directed forces.

It may further be useful to reduce the risk of jamming by rounding the sharp edges of the coolant guiding and/or mixing fins situated in the vicinity of the corners of the belt; rounding can be accomplished by a mechanical or thermal process.

Various materials have been used for forming the fuel assembly grids, more particularly zirconium base alloys and iron-chromium-nickel alloys. The material of the belt of a grid is selected taking into account the condition to be fulfilled as a priority (minimum neutron absorption or high mechanical characteristics). Some of the usable materials may be shaped with relatively complex forms of the belt corners. Then, it is advantageous to extend the gussets as far as possible upwards, possibly to such a point that they extend as far as the corner fuel rods.

Figure 7:
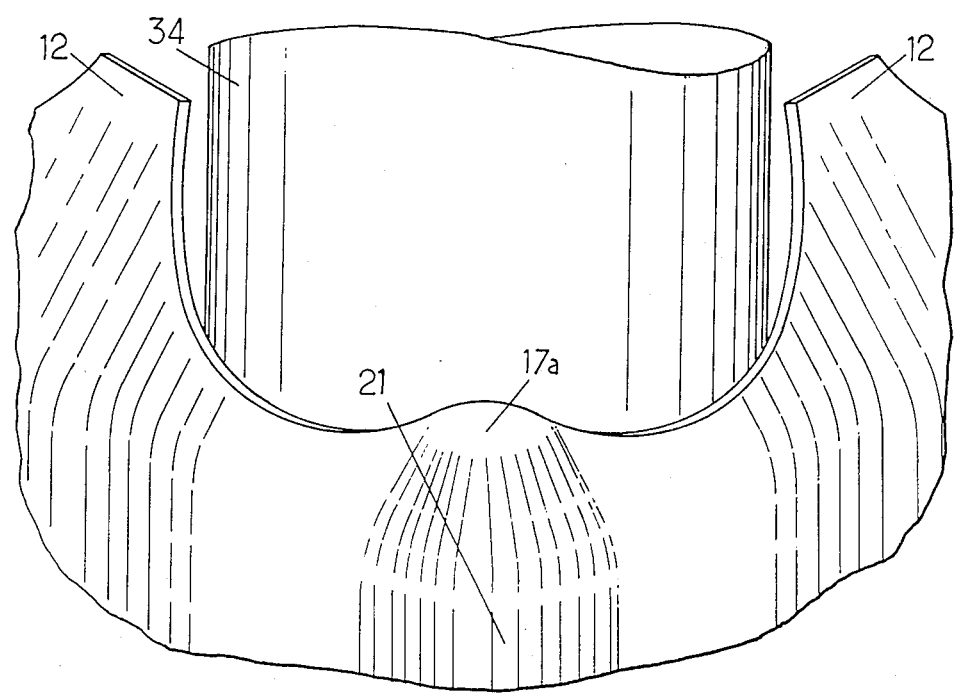
FIG. 7 is a diagram on an enlarged scale, in perspective, showing a possible construction of a corner hood of a grid in accordance with another modification of the invention.
Figure 8:
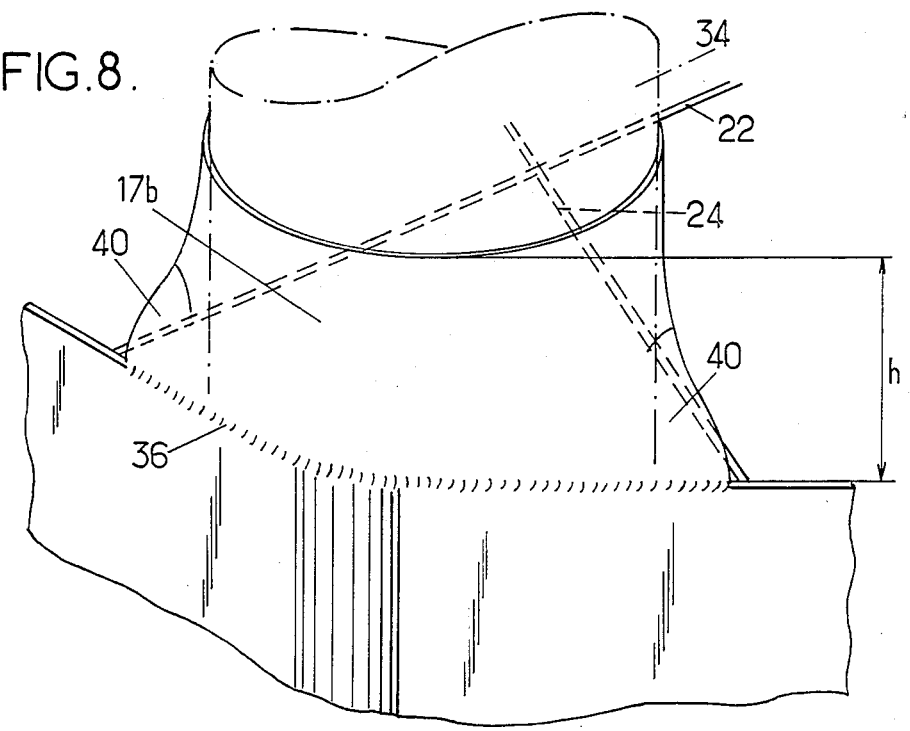
FIGS. 8 and 9, similar to FIG. 7, show two other hood constructions.
Figure 9:
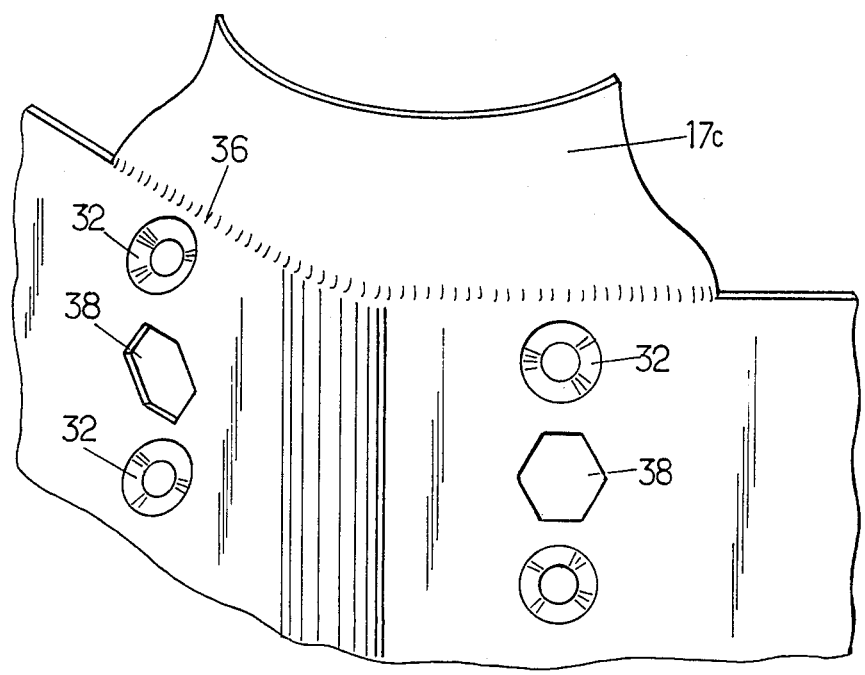

In the embodiment of the invention shown in FIG. 7, where the elements already described are once again designated by the same reference number, gussets 17a project upwardly beyond the base of fins 12 and have a convex shape, merging with the quarter-round 22. This arrangement leaves a free gap for coolant flow between the belt of the grid and the periphery of the corner rod 34. As shown in FIGS. 8 and 9, on the other hand, the hood shaped gussets 17b and 17c extend as far as the rod 34 and are applied against the external surface thereof. For that, the gussets typically have a form which is convex outwardly at their base, then becomes outwardly concave. In practice, it is sufficient for the gussets to have a height h of 5 to 6 mm which is at least equal to that of the adjacent fins 12. The gussets may be welded at 36 to the strip forming the belt. If they are relatively short, as shown in FIG. 7, they may be formed directly by bending and stamping the belt. To compensate for the narrowing or even closure of the coolant flow channel along rod 34 placed at the corner, flow openings 38 may be provided in the belt (FIG. 9) between the bearing bosses 32.

Reinforcement zones 40 may in addition be secured to the edges of the hood (FIG. 8), which will usually end in alignment with the first plates 22 and 24.

We claim:

1. A spacer grid for spacing longitudinally extending fuel rods of a nuclear fuel assembly, comprising:
   at least two interleaved sets of plates, each set consisting of mutually parallel plates and the plates of two sets being at an angle to each other for defining passages for said fuel rods, and
   an external belt formed as a strip having parallel edges provided with fins folded along said edges, said belt having flat faces and corners between adjoining ones of said flat faces, all said corners being devoid of openings and said plates having ends securely connected to said belt,
   wherein two at least of said corners each consists of a rounded portion to be located inside of imaginary extensions of said flat faces of the belt between the corners and wherein each of said two at least of said corners is joined to said edges by flat gussets sloping towards the inside of said belt, terminating short of said edges.

2. Spacer grid according to claim 1, wherein each corner is formed on a strip section, said belt consisting of a plurality of mutually secured said strip sections.

3. Spacer grid according to claim 1, wherein said strip comprises one section only, whose ends are welded to each other within one of said flat faces of the belt.

4. A spacer grid for spacing longitudinally extending fuel rods of a nuclear fuel assembly, comprising:
   at least two interleaved sets of plates, each set consisting of mutually parallel plates and the plates of two sets being at an angle to each other for defining passages for said fuel rods, and
   an external belt formed as a strip having parallel edges one at least of which is provided with fins, said belt having flat faces and corners between adjoining ones of said flat faces, all said corners being devoid of openings and said plates having ends securely connected to said belt,
   wherein two at least of said corners are truncated and rounded to be located inside of imaginary extensions of said flat faces of the belt between the corners and wherein each of said two at least of said corners is joined to said edges by gussets sloping towards the inside of said belt, each of said gussets forming a sloping hood extending in the longitudinal direction of the fuel rods and projecting beyond the remainder of the belt, including the fins, for enveloping a respective corner fuel rod among said fuel rods.

5. A spacer grid for spacing longitudinally extending fuel rods to a nuclear fuel assembly, comprising:
   at least two interleaved sets of plates, each set consisting of mutually parallel plates and the plates of two sets being at an angle to each other for defining passages for said fuel rods, and
   an external belt formed as a strip having parallel edges one at least of which is provided with fins said belt having flat faces each parallel to the plates in a respective one of said sets and corners between adjoining ones of said flat faces, said belt being devoid of unobturated openings and said plates having ends securely connected to said belt,
   wherein two at least of said corners are truncated to be located inside of imaginary extensions of said flat faces of the belt between the corners and wherein each of said two at least of said corners is joined to said edges by gussets sloping towards the inside of said belt,
   wherein said belt is devoid of springs and is formed with back-up bosses directed inwardly and distributed in two parallel rows situated one after the other in the longitudinal direction of the rods, alternating with the plates and constituting abutments for said fuel rods, and
   wherein said plates have a plurality of springs, those of said springs which are provided on the plates adjacent to said belt biasing respective ones of said fuel rods in abutment against said back-up bosses.

6. Spacer grid according to claim 5, wherein each of said gussets constitutes a sloped hood extending up to the location of a corner one of said fuel rods.

7. Spacer grid according to claim 5, wherein each of said gussets forms a hood of approximately spherical cap shape extending up to the location of a corner one of said fuel rod.

8. Spacer grid according to claim 4, wherein coolant flow openings are formed in said belt for coolant flow in each zone where one of said hoods prevents coolant flow along the respective corner fuel rod.

9. Spacer grid according to claim 5, further including spacing bosses between adjacent assembly grids, formed by outward stamping on the flat face of the belt.

* * * * *